(12) United States Patent
Teller

(10) Patent No.: US 6,299,848 B1
(45) Date of Patent: *Oct. 9, 2001

(54) PROCESS FOR REMOVING SULFUR DIOXIDE OUT OF A GAS

(75) Inventor: Aaron J. Teller, Palm Beach Gardens, FL (US)

(73) Assignee: Hamon Research-Cottrell, Branchburg, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,376

(22) Filed: Sep. 25, 1998

(51) Int. Cl.[7] .................................................. B01D 53/50
(52) U.S. Cl. ................................ 423/242.1; 423/243.08; 423/244.07
(58) Field of Search ..................... 423/210, 242.1, 423/243.08, 244.07, 244.08

(56) References Cited

U.S. PATENT DOCUMENTS

| | | | |
|---|---|---|---|
| 1,271,899 | 7/1918 | Howard et al. | 423/242.1 |
| 1,701,825 | 2/1929 | Seil | 423/220 |
| 2,200,581 | 5/1940 | Pruss | 423/210 |
| 3,216,905 | 11/1965 | Bapist | 423/210 |
| 3,533,748 | 10/1970 | Finfer | 423/242.1 |
| 3,632,306 | 1/1972 | Fisher | 423/242.1 |
| 3,828,525 | 8/1974 | Copa | 423/310 |
| 3,962,410 | 6/1976 | Renault | 423/574 R |
| 3,963,825 | 6/1976 | Bratzler | 423/223 |
| 3,972,980 | 8/1976 | Lowell | 423/242 |
| 3,976,747 | 8/1976 | Shale et al. | 423/244 |
| 3,984,529 | 10/1976 | Tung | 423/575 |
| 3,987,147 | 10/1976 | Guerrieri | 423/242 |
| 4,237,104 | 12/1980 | Urban | 423/242 |
| 4,255,388 | 3/1981 | Miller | 422/168 |
| 4,293,524 | 10/1981 | Teller et al. | 422/168 |
| 4,319,890 | 3/1982 | Teller et al. | 55/1 |
| 4,328,195 | 5/1982 | Mori | 423/242 |
| 4,410,500 | 10/1983 | Mori | 423/242 |
| 4,446,109 | 5/1984 | Bakke | 422/168 |
| 4,452,766 | 6/1984 | Pike | 423/242 |
| 4,472,364 | 9/1984 | Bauerle et al. | 423/242 |
| 4,504,451 | 3/1985 | Quee et al. | 423/242 |
| 4,544,381 | 10/1985 | Schmidt | 55/89 |

(List continued on next page.)

OTHER PUBLICATIONS

Grant et al. Grant and Hackh's Chemical Dictionary, 5th Edition, McGraw–Hill Book Company U.S.A., pp. 231, 443, 465, 466, 535 & 565, ISBN 0–07–024067–1, 1987 no month.*

Primary Examiner—Steven P. Griffin
Assistant Examiner—Timothy Vanoy
(74) Attorney, Agent, or Firm—Howrey Simon Arnold & White, LLP

(57) ABSTRACT

A method for removing sulfur dioxide out of a gas is provided. The sulfur dioxide contaminated gas is contacted with an aqueous solution or slurry that contains a reagent, such as sodium carbonate or sodium bicarbonate, in a reactor that may be a spray drier or a quench reactor and a gas having a diminished quantity of sulfur dioxide; unreacted reagent; sulfate reaction product, and which is at a temperature in the range of about 130 to 200 ° F. and a humidity in the range of 10 to 70 percent is produced. Particulate calcium hydroxide is blown into this gas through a device, such as dry venturi. The dry venturi removes aerosols out of the gas and helps ensure that the downstream filter cake is porous and non-tacky. The gas is then passed through a filtering device so that solids in the gas accumulate on the filter device, thus forming a filter cake. At least a portion of the sulfur dioxide in the gas is removed via passage of the gas through this filter cake.

17 Claims, 1 Drawing Sheet

U.S. PATENT DOCUMENTS

| | | | |
|---|---|---|---|
| 4,576,803 | 3/1986 | Hegemann | 423/242 |
| 4,581,210 | 4/1986 | Teller | 423/242 |
| 4,595,576 | 6/1986 | Andreasen et al. | 423/242 |
| 4,662,900 | 5/1987 | Ottengraf | 55/90 |
| 4,756,892 | 7/1988 | Kragh et al. | 423/242 |
| 4,781,732 | 11/1988 | Wondrasch | 55/10 |
| 4,818,505 | 4/1989 | Muller | 423/210 |
| 4,921,886 | 5/1990 | Ewan et al. | 423/235 |
| 4,999,302 | 3/1991 | Kahler | 435/266 |
| 5,002,743 | 3/1991 | Kokkonen et al. | 423/244 |
| 5,047,218 | 9/1991 | Ortega | 423/224 |
| 5,077,025 | 12/1991 | Glass | 423/245.1 |
| 5,246,680 | 9/1993 | Pikkujamsa | 423/244.07 |
| 5,266,285 | 11/1993 | Glancy | 423/243.09 |
| 5,273,721 | 12/1993 | Hallstrom | 422/147 |
| 5,279,963 | 1/1994 | Hobby | 435/266 |
| 5,409,834 | 4/1995 | Birdwell | 435/310 |
| 5,480,624 | 1/1996 | Kuivalainen | 423/210 |
| 5,575,982 | 11/1996 | Reiss et al. | 428/210 |
| 5,636,240 * | 6/1997 | Tsai et al. | 373/27 |
| 6,033,639 * | 3/2000 | Odenmo | 423/210 |

* cited by examiner

PROCESS FOR REMOVING SULFUR DIOXIDE OUT OF A GAS

BACKGROUND OF THE INVENTION

1. Field of the Invention

The present invention relates to a semi-dry scrubbing process for the removal of sulfur dioxide from gases and to a filter cake used therein.

2. Description of the Related Arts

A variety of industrial and commercial plants generate pollutant-containing gas streams. Sintering and coal burning operations typically generate unacceptably high levels of sulfur dioxide ($SO_2$). These gas streams must be cleansed or "scrubbed" before being released to the atmosphere. One of the known techniques for removing $SO_2$ and other similar pollutants is the "semi-dry" scrubbing process.

Generally the semi-dry scrubbing process comprises contacting the gas with an aqueous solution or slurry of a reagent to neutralize the pollutant, under conditions that evaporate the liquid water carrier, for example, contacting in a spray drier. The resulting gas stream, which is cooler and more humid, will contain particulates of unreacted reagent and reaction product(s). These particulates are normally removed from the gas by a particle separator such as a baghouse to yield a scrubbed, pollutant-reduced gas.

Such a system is a compromise between the wet scrubbing process where high pollutant removal efficiencies are achieved but with high maintenance and liquid disposal costs, and the dry scrubbing process, where lower removal efficiencies are obtained. In the semi-dry process, the initial presence of water or other liquid catalyzes a more rapid pollutant transfer (capture) and neutralization (reaction) than in simply passing the gas over a solid reactant as in the dry scrubbing process. However, because the liquid is dried or evaporated, no liquid waste stream is formed as in the wet scrubbing process, thereby reducing the maintenance and disposal costs. Another disadvantage associated with wet scrubbing is the common requirement that the gas be cooled and water-saturated in order to avoid evaporation of the absorbent. The gas often must then be reheated to burn-off excess moisture in the gas before being discharged to the atmosphere so that the plume is not overly dense and offensive. As a result of these demands, the wet scrubbing process usually requires substantial equipment and energy consumption.

Suitable reagents in the semi-dry scrubbing process include lime compounds such as hydrated lime, limestone, etc., as well as alkali compounds such as sodium carbonate. The lime reagents are generally less expensive than the alkali reagents, but the alkali reagents are generally more effective. Because of these trade-offs, lime is normally used unless the required removal efficiency/reliability requires an alkali reagent or it otherwise becomes more cost effective.

While the initial aqueous contacting step generally provides the main pollutant removal effect, the subsequent particulate filter can provide supplemental pollutant removal efficiency. In a typical $SO_2$ semi-dry scrubbing process where the gas is contacted in a spray drier with a lime slurry, about 70–80% of the $SO_2$ is removed in the spray drier and up to about 20% of the $SO_2$ is additionally removed in the baghouse (overall removal is about 80–90%). This additional removal is possible in the baghouse because of the contact of the gas with the accumulated filter cake present on the filter. The filter cake contains the particulates removed from the gas including the unreacted lime. Thus, the filter cake can operate as a dry scrub reactor. However, the removal efficiency is inconsistent, ranging from near zero to 40% (efficiency based on the residual amount of pollutant), and is generally independent of the ratio of the residual pollutant in the gas stream to the unreacted lime in the cake (the residual "$\alpha$").

U.S. Pat. No. 4,581,210, the entire contents of which are incorporated herein by reference, teaches that introducing a sorbent such as limestone via a dry venturi into the humidified gas between the quench reactor and the baghouse increases $SO_2$ removal efficiency in the baghouse. According to this patent, the dry venturi facilitates formation of an improved filter cake which acts as an improved secondary fixed-bed reactor in the baghouse to further purify the gas. The cake is substantially non-tacky and porous, thus allowing much greater cake buildup over the prior art systems before removal is required.

However, the gases being scrubbed in this patent generally contain HCl, as is commonly found in municipal waste incinerators. Further, the patent requires doping of the calcium based slurry used in the spray drier or quench reactor with a hygroscopic agent. Either one of these features increases the adsorption of water in the filter cake which in turn is believed to catalyze the $SO_2$ transfer and reaction. Accordingly, such a method is not expected to be suitable for treating other types of gas streams such as those derived from sintering operations, or without the dopant.

SUMMARY OF THE INVENTION

It is an object of the present invention to provide an efficient semi-dry scrubbing process for removing $SO_2$ from a gas stream.

It is another object of the invention to provide a semi-dry scrubbing process that effectively utilizes the particulate filter for $SO_2$ removal.

A further object of the present invention is to provide a filter cake useful in pollutant removal from gaseous streams.

Preferred forms of the present invention accomplish at least one of the above objects. One embodiment of the present invention is a semi-dry process for removing sulfur dioxide from a gas stream. The process comprises (1) combining a gas stream containing $SO_2$ with an aqueous solution or slurry stream containing a first reactant to evaporate the water in the solution or slurry and form a humidified gas stream; (2) entraining a second reactant in the humidified gas stream; and (3) subsequently passing the humidified gas stream through a filter; wherein one of the first and second reactants is a lime compound and the other is an alkali carbonate compound.

Another embodiment of the present invention relates to a filter cake comprising a lime compound, an alkali carbonate, and an alkali sulfate in sufficient admixture to provide a water adsorbing lime-alkali sulfate complex.

Yet another form of the invention contemplates a process for removing $SO_2$ from a gas stream, which comprises passing a humidified gas containing $SO_2$ through a filter cake supported on a filter to reduce the amount of $SO_2$ in the gas by about 60 to 90%. The filter cake comprises a lime compound, an alkali carbonate, and an alkali sulfate in sufficient admixture to provide a water adsorbing lime-alkali sulfate complex.

The present invention is based on the discovery that the use of two specified reagents in a semi-dry scrubbing process increases the $SO_2$ scrubbing efficiency in general and that an improved filter cake can be formed having good removal efficiencies in particular. While not wishing to be bound by any theory, it is believed that the filter cake contains the alkali sulfate reaction product in close proximity/touching the unreacted lime and that this "complex" forms a water adsorbing site. The water present in the gas is thus adsorbed onto this site forming a liquid microenvironment. The water catalyzes the absorption of the $SO_2$ out of the gas and facilitates rapid neutralization with the adjacent unreacted lime. This system allows for high $SO_2$ removal efficiencies even without the use of a hygroscopic dopant and even without HCl in the gas stream.

DETAILED DESCRIPTION OF THE INVENTION

Figure 1:
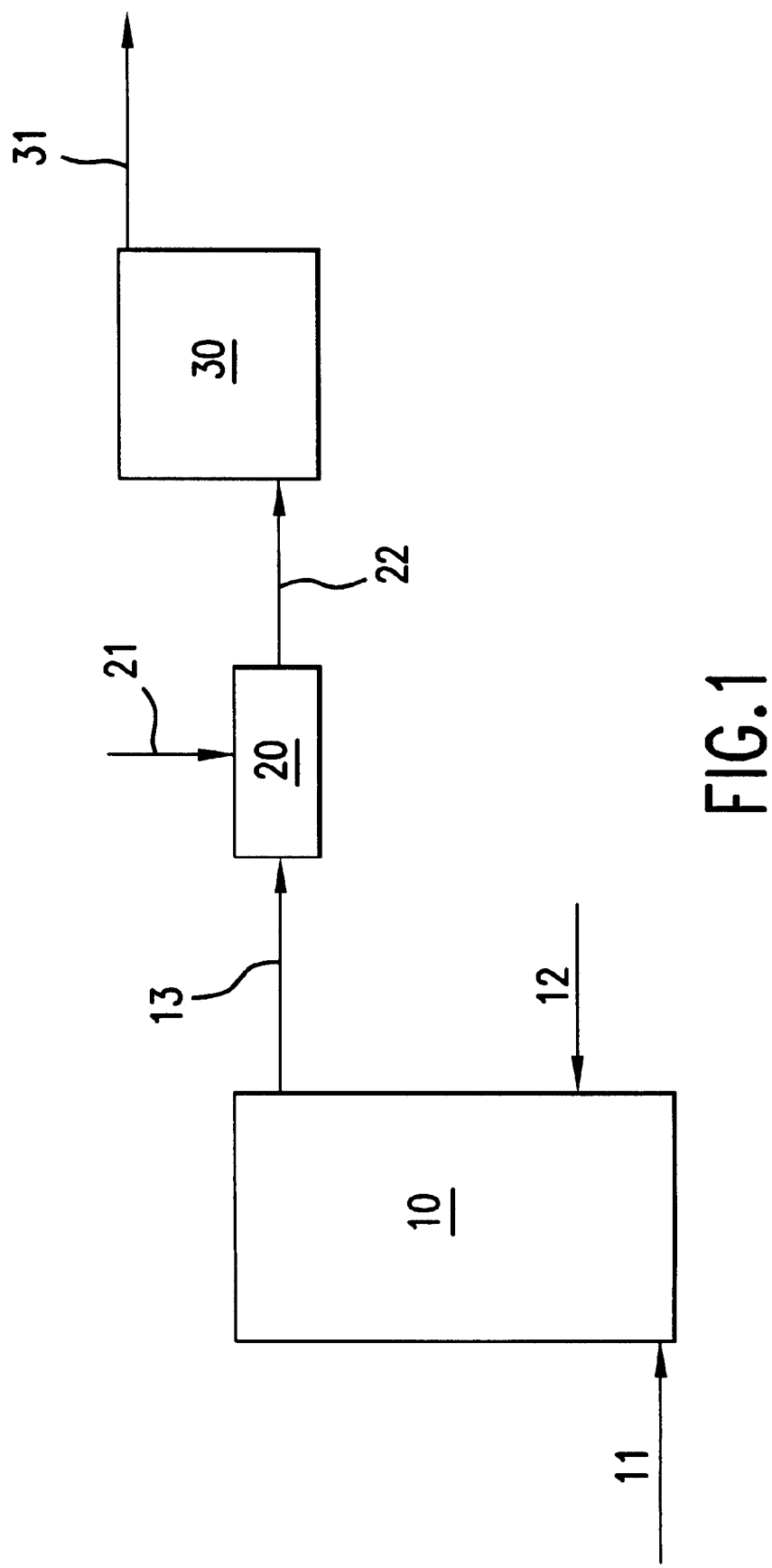
FIG. 1 is a flow diagram of the preferred embodiment process for removing sulfur dioxide from an exhaust gas according to the principles of the invention.

The semi-dry scrubbing process of the present invention relates to the use of two different reagents added at different locations in the process. The reagents are alkali carbonate compounds and lime compounds. The alkali carbonate compounds include sodium carbonate, potassium carbonate, etc., as well as the bicarbonate forms thereof. The lime compounds embrace all forms of lime and limestone including calcium oxide, calcium hydroxide, and calcium carbonate (limestone). The first reagent is introduced to the gas in the initial contact zone via an aqueous solution or slurry while the second reagent is introduced downstream into the humidified gas but before the filter. Generally, either the alkali carbonate compound or the lime compound is used as the sole first reagent and the other is used as the sole second reagent. However, such single usage is not required. Multiple types or species of reagents can be used, so long as at least one compound from the class of alkali carbonate compounds or the class of lime compounds is used as the first reagent and at least one compound from the other class is used as the second reagent. Accordingly, in accordance with the present invention, an alkali carbonate compound and a lime compound can be used together in the initial gas contact step with the subsequent addition to the humidified gas of either an alkali carbonate compound or a lime compound, or both. In one form of the invention, an alkali carbonate compound, preferably sodium carbonate, is used as the sole first reagent and a lime compound, preferably calcium carbonate from a cost perspective, is used as the second reagent.

The reagents chemically react with $SO_2$ in a neutralization reaction. For example, sulfur dioxide is neutralized by hydrated lime (calcium hydroxide) to form calcium sulfate and water as shown below.

$$SO_2 + Ca(OH)_2 \rightarrow CaSO_3 + H_2O$$

Three other reaction products are also possible, but are normally formed in minor amounts, namely calcium sulfite, calcium bisulfate, and calcium bisulfite. Similarly, alkali carbonates react with $SO_2$ to form alkali sulfates and minor amounts of alkali sulfite, alkali bisulfate, and alkali bisulfite. For ease of description, all four possible reaction products are referred to generally as the sulfates, unless otherwise indicated.

The gas streams to be scrubbed by the present invention need only contain sulfur dioxide and can be generated from a variety of processes. One source is a steel manufacturing plant, especially at the sintering facility. The exhaust gas from sintering, unlike from an incinerator, generally contains $SO_2$ but not HCl. The present invention is particularly suitable for scrubbing HCl-free gases. However, it should be clear that the gas to be scrubbed can contain other pollutants in addition to $SO_2$.

The gas to be scrubbed and an aqueous solution or slurry of the first reagent are supplied to a contacting device so as to completely dry the slurry or solution. Such a contacting device and its operation are in general well known to the worker skilled in this field. In general, the liquid is dispersed in the gas stream as liquid droplets which are rapidly evaporated (dried). For example, the gas and liquid can be combined and jetted through a nozzle to form fine droplets of the liquid in the gas stream or, more typically, the liquid alone can be jetted into the gas stream through a nozzle to form fine droplets therein. The invention, however, is not limited to such techniques and any scheme wherein the liquid and gas are combined and the liquid dried can be used. Preferred devices for carrying out this contacting operation are spray driers and quench reactors, both of which are well known in the art. For example, U.S. Pat. No. 4,293,524, the entire contents of which are incorporated herein by reference, describes an improved quench reactor having a pretreatment zone, a throat, and a reaction chamber, that is suitable for use in the present invention.

The flow rates used in the present invention can vary greatly. Typically the gas flow rate is within the range from 1,000 to 1,000,000 dry standard cubic feet per minute, more typically from 100,000 to 500,000 dry standard cubic feet per minute. The gas will usually have a temperature in the range of 200 to 600° F., more typically 200 to 350° F., and frequently around 250 to 300° F. The concentration of the water-soluble pollutant in the gas stream is not particularly limited and is generally at least 100 ppm, typically within the range from 50 to 2,000 ppm.

The liquid flow rate and the concentration of the reagent (s) therein can be determined based on the flow rate, temperature, humidity and pollutant concentration of the gas, as is well known in the art. Generally, the liquid flow rate is such that the gas is cooled and humidified by at least 25° F. but not down to the dew point of the gas or below. Preferably, the gas is cooled and humidified to not lower than 20° F. above the dew point, more preferably from 30° F. to 70° F. above the due point of the gas.

In terms of temperature, the humidified gas produced from the drying of the liquid is generally in the range of from about 130–200° F., preferably about 140–185° F., more preferably about 150–170° F. The relative humidity of the humidified gas normally ranges from 10% to 70%. However, one advantage of the present invention is that lower humidity levels are fully operable. Thus, while some prior art semi-dry scrubbing processes required a relative humidity of as much as 50–60% in order to be reasonably effective, the present invention can be effectively practiced with relative humidity levels of less than 35%, even as low as 10–12%. This ability to operate at low relative humidity lessens the risk of liquid deposits being inadvertently formed on the equipment thereby reducing clogging and corrosion risks.

The concentration of the reactant contained in the liquid is based on the liquid flow rate and the desired level of reaction with the pollutant. Generally, the reactant concentration in the solution or slurry is about 2–10%, by weight, although higher or lower amounts are also possible. Preferably in the present invention, the amount of reactant contained in the liquid is such that at the given liquid flow rate, the molar ratio of the reactant to the water-soluble pollutant is less than 1. That is, the amount of reactant is less than the stoichiometric amount. The use of less than the stoichiometrically required amount of reactant is generally quite different from the conventional prior art semi-dry scrubbing processes, where excess reactant is normally required. However, because of the increased efficiency of the filter in the present invention, less reactant can be used. Accordingly, one embodiment of the present invention uses a molar ratio of 0.8 or less, more preferably from about 0.2 to 0.6. This embodiment is especially useful, from a cost perspective, when the first reactant is an alkali carbonate compound.

The humidified gas leaving the contacting device (e.g. spray drier) contains particulates of the first reactant and the sulfate product entrained therein. As the humidified gas moves toward the filter, additional $SO_2$ removal can occur as the $SO_2$ comes into contact with the remaining reactant. It should be noted that other particulates may also be present in the gas such as fly ash, etc.

The second reactant is then added to the gas stream so as to be entrained therein. The second reactant is not in a liquid carrier but rather is in particulate form, typically from 1–50 microns. Various techniques and devices for entraining particles into a gas steam are known and useable in the present invention. In general, the second reactant is blown into the gas stream by an inert carrier gas such as air or nitrogen, but this is not required. The direction or angle of the blown particles, relative to the humidified gas stream, can take a variety of forms including concurrent, transverse, countercurrent, helical or spiral flow. A preferred device, however, is a dry venturi as described in U.S. Pat. No. 4,319,890, the entire contents of which are incorporated herein by reference. The use of a dry venturi helps to remove sub-micron size particles from the humidified gas stream including aerosols, if present. Removing the aerosols and the like helps to insure that the cake formed on the subsequent filter is porous and non-tacky. Also, the thorough intermixing afford by the dry venturi can aid in the $SO_2$ removal efficiency, both in the dry venturi itself and subsequently as the gas travels toward the filter. The amount of second reactant to be added is not particularly limited and typically is sufficient to provide a molar ratio relative to the remaining $SO_2$ within in the range of about 0.5 to 4.0. As mentioned earlier, the second reactant is preferably a lime compound.

After the second reactant is entrained, the gas stream is passed through a filter in order to remove the particulates therefrom. Suitable filtering devices are well known and are typically a screen filter or baghouse design. The filter size is not particularly limited especially when a dry venturi is used for entraining the second reactant. In this case, the filter size can be quite large, even larger than the average size of the particles to be removed because the filter cake formed thereon will capture the particulates. The filter need only be sufficient for forming and supporting the accumulating filter cake. Thus, inexpensive bags may be used.

The filter cake thus formed provides a secondary fixed-bed dry scrubbing reactor. The cake contains the residual first and second reactants, the alkali sulfate products, and optionally further particulates and/or oils. The cake is preferably non-tacky, hydrophobic, and highly permeable, such as provided by a dry venturi as discussed above. As the humidified gas passes through the filter cake, at least a portion of the remaining $SO_2$ is removed from the gas and neutralized by the filter cake. Typically at least 50% of the remaining $SO_2$ is removed by the filter cake, preferably 60 to 90% is removed. This means that the overall efficiency of the semi-dry scrubbing process can easily be greater than 90%, and is preferably greater than 95%.

It is believed that in the cake of the present invention, the lime compound, alkali carbonate compound, and alkali sulfate are sufficiently admixed to provide a water adsorbing lime-alkali sulfate complex. The term "complex" means only that the proximity of the alkali sulfate to the lime compound creates a good site for water adsorption. The term "complex" is not meant to imply or require that the compounds are electronically bonded. The proximity needed of the two compounds is apparently achieved by the touching or near touching of a lime particulate and an alkali sulfate particulate. While not wishing to be bound by any theory, it is believed that the formation in the filter cake of many water adsorbing lime-alkali sulfate complexes causes water to be adsorbed in the filter cake where it increases the kinetics of absorption. By capturing $SO_2$ more rapidly and easily, the $SO_2$ removal efficiency is significantly increased.

Preferred embodiments of the present invention will now be described with respect to the drawing figure. An $SO_2$-containing gas stream 11 from a sintering process is supplied to spray drier (or quench reactor) 10 at about 250° F. An aqueous solution of sodium carbonate 12 is also supplied to the spray drier 10 at a rate sufficient to form a molar ratio of about 0.6 with respect to the $SO_2$. A portion of the $SO_2$ is absorbed into the aqueous solution and neutralized while the solution is dried. The resulting cooled and humidified gas 13 exits the spray drier 10. The humidified gas 13 typically has a temperature of around 150–160° F. and a relative humidity of around 20–30%. Between approximately 55% and 60% of the sodium carbonate reagent is utilized in the spray drier. The humidified gas 13 contains particulates of the unreacted sodium carbonate and of the sodium sulfate reaction product. The humidified gas 13 is then contacted with dry hydrated lime (or limestone) in dry venturi 20 at a molar ratio of approximately 3. Here, the molar ratio is the ratio between the lime and the quantity of sulfur dioxide in the gas leaving the spray drier 10. The resulting gas stream 22 is then conveyed to baghouse 30 where the particulates are removed from the gas. The filter cake formed therein is 0.05 to 1 inch in thickness or more and is non-tacky. Remaining $SO_2$ in the gas is removed by the filter cake in the baghouse and then the particulate-reduced, $SO_2$-reduced stream is sent for further processing, if any, and released to atmosphere. This process results in sulfur dioxide being removed in the baghouse at an efficiency of 64% to 84%. While not preferred, other environmental control devices, not shown, could be interposed between the spray drier 10 and baghouse 30.

The invention having been thus described, it will be obvious that the same may be varied in many ways without departing from the spirit and scope thereof. All such modifications are intended to be included within the scope of the invention which is defined by the following claims.

I claim:

1. A semi-dry process for removing sulfur dioxide from a gas stream, which comprises;

combining a gas stream containing sulfur dioxide with an aqueous solution or slurry stream containing a first reactant, said combining occurring under such conditions so as to evaporate the water in said solution or slurry and form a humidified gas stream;

entraining a second reactant in said humidified gas stream; and subsequently passing said humidified gas stream through a filter;

wherein said first reactant is an alkali carbonate and said second reactant is calcium hydroxide.

2. The process according to claim 1, wherein said alkali carbonate is selected from the group consisting of sodium carbonate, sodium bicarbonate, potassium carbonate and potassium bicarbonate.

3. The process according to claim 2, wherein said alkali carbonate is sodium carbonate, sodium bicarbonate, or mixtures thereof.

4. The process according to claim 1, wherein said gas stream is produced from a sintering process.

5. The process according to claim 1, wherein said humidified gas stream has a temperature in the range of about 130 to 200° F.

6. The process according to claim 5, wherein the temperature of said humidified gas is in the range of about 140 to 185° F.

7. The process according to claim 6, wherein the temperature of said humidified gas is in the range of about 150 to 180° F.

8. The process according to claim 1, wherein said humidified gas stream has a temperature at least 20° F. greater than its dew point.

9. The process according to claim 8, wherein the temperature of said humidified gas is 30 to 70° F. greater than its dew point.

10. The process according to claim 1, wherein said step of combining occurs in a spray drier.

11. The process according to claim 1, wherein said step of combining occurs in a quench reactor.

12. The process according to claim 1, wherein said alkali carbonate is combined with said gas stream at a molar ratio of less than 1, relative to the amount of sulfur dioxide.

13. The process according to claim 12, wherein said molar ratio is from about 0.2 to about 0.6.

14. The process according to claim 1, wherein said calcium hydroxide is entrained via a dry venturi.

15. The process according to claim 1, wherein said calcium hydroxide is added to said humidified gas stream at a molar ratio of calcium hydroxide to residual sulfur dioxide of from about 0.5 to about 4.

16. The process according to claim 1, wherein said filter is a baghouse.

17. A method for removing sulfur dioxide from a gas stream, which comprises:

combining a gas stream containing sulfur dioxide with an aqueous solution comprising a first reactant comprising at least one sodium carbonate and sodium bicarbonate to neutralize a portion of said sulfur dioxide, said combining occurring under such conditions so as to evaporate the aqueous solution to form a humidified gas stream comprising a sodium sulfate compound, wherein the molar ratio of said first reactant to said sulfur dioxide is less than 0.8;

entraining calcium hydroxide particles into said humidified gas stream, wherein the molar ratio of calcium hydroxide to the remaining sulfur dioxide is from 0.5 to 4; and subsequently passing said humidified gas stream through a filter having a filter cake thereon to remove particulates from said humidified gas and to neutralize a portion of the sulfur dioxide remaining in said humidified gas stream.

* * * * *